United States Patent [19]

Kimura et al.

[11] Patent Number: 5,430,646
[45] Date of Patent: Jul. 4, 1995

[54] SYSTEM AND METHOD FOR CONTROLLING DAMPING FORCE COEFFICIENT OF SHOCK ABSORBER APPLICABLE TO AUTOMOTIVE SUPENSION

[75] Inventors: Makoto Kimura; Toru Takahashi; Hiroyuki Shimizu, all of Kanagawa Pref., Japan

[73] Assignee: Atsugi Unisia Corporation, Japan

[21] Appl. No.: 836,707

[22] Filed: Feb. 18, 1992

[30] Foreign Application Priority Data

Feb. 22, 1991 [JP] Japan .................................. 3-28844
Feb. 22, 1991 [JP] Japan .................................. 3-28845

[51] Int. Cl.⁶ .......................................... B60G 17/015
[52] U.S. Cl. ................................ 364/424.05; 280/707
[58] Field of Search ................... 364/424.05; 280/703, 280/707, 840, DIG. 1

[56] References Cited

U.S. PATENT DOCUMENTS

| | | | |
|---|---|---|---|
| 4,696,489 | 9/1987 | Fujishiro et al. | 280/707 |
| 4,765,648 | 8/1988 | Mander et al. | 280/707 |
| 4,770,438 | 9/1988 | Sugasawa et al. | 280/707 |
| 4,921,272 | 5/1990 | Ivers | 280/707 |
| 4,953,089 | 8/1990 | Wolfe | 364/424.05 |
| 4,961,483 | 10/1990 | Yamaoka et al. | 188/299 |
| 4,969,662 | 11/1990 | Stuart | 280/707 |
| 5,020,781 | 6/1991 | Huang | 280/707 X |
| 5,071,159 | 12/1991 | Kamimura et al. | 280/707 |
| 5,075,855 | 12/1991 | Sugasawa et al. | 364/424.05 |
| 5,133,574 | 7/1992 | Yamaoka et al. | 280/707 |
| 5,199,737 | 4/1993 | Huang | 280/707 |
| 5,203,584 | 4/1993 | Butsuen et al. | 280/707 |
| 5,269,557 | 12/1993 | Butsuen et al. | 280/707 |
| 5,276,623 | 1/1994 | Wolfe | 364/424.05 |

FOREIGN PATENT DOCUMENTS

| | | |
|---|---|---|
| 3938304 | 5/1990 | Germany . |
| 61-163011 | 7/1986 | Japan . |
| 62-181908 | 8/1987 | Japan . |
| 64-60411 | 3/1989 | Japan . |

Primary Examiner—Gary Chin
Assistant Examiner—Collin W. Park
Attorney, Agent, or Firm—Ronald P. Kananen

[57] ABSTRACT

In a vehicular suspension a vertical acceleration of a sprung mass of a vehicular body and a relative speed between the sprung mass and an unsprung mass (viz., a wheel assembly) are detected. A sprung mass vibrating frequency is derived on the basis of detected vertical accelleration and relative speed, and a control unit determines whether the derived sprung mass vibrating frequency is equal to or higher than a predetermined dead frequency or not. The control unit outputs a control signal to the damper to change the damping force coefficient on the basis of the determination of whether the derived sprung mass vibrating frequency is equal to or higher than a predetermined dead frequency or not.

10 Claims, 8 Drawing Sheets

SYSTEM AND METHOD FOR CONTROLLING DAMPING FORCE COEFFICIENT OF SHOCK ABSORBER APPLICABLE TO AUTOMOTIVE SUPENSION

BACKGROUND OF THE INVENTION (1) Field of the Invention

The present invention relates generally to an automotive vehicular suspension. More specifically, the present invention relates to a system and method for variably controlling a damping force coefficient of a shock absorber (hereinafter referred to as a damper) installed between an unsprung mass and a sprung mass of the automotive vehicle.

(2) Description of the Background Art

A Japanese Patent Application First (unexamined) Publication No. Showa 64-60411 published on Mar. 7, 1989 exemplifies a previously proposed damping force coefficient controlling system for a damping force variable damper.

This previously proposed-damping force coefficient controlling system detects a relative speed of an unsprung mass with respect to a sprung mass, compares the detected relative speed (damping force) with a predetermined threshold value, and controls the damping force coefficient toward a high damping force coefficient side when the relative speed exceeds the threshold value.

However, since at a high frequency region in which an sprung mass vibrating frequency exceeds a resonance frequency, a frequency (number of times) at which the relative speed (damping force) exceeds the predetermined threshold value, the damper is held at the higher damping force coefficient side. Therefore, the damping force which is generated is more than necessary and results in vehicular comfort being degraded.

In addition, another previously proposed damping coefficient variably controlling system has been disclosed in a Japanese Patent Application No. Showa 61-163011 published on Jun. 23, 1986.

This second previously proposed damping force coefficient controlling system derives the sprung mass speed (velocity) and the relative speed (velocity) between the unsprung mass and sprung mass, controls the damping force coefficient toward the higher damping force coefficient side when a sign (polarity) of the sprung mass speed coincides with a sign (polarity) of the relative speed, and controls the damping force coefficient toward a lower damping coefficient side when the polarities do not coincide.

However, although there is no problem in a case where the sprung mass vibrating frequency occurs at a frequency lower than the sprung mass resonance frequency, the control timing deviates from its normal timing due to influences of control electrical delay and hydraulic response delay of hydraulic pressure in a hydraulic chamber of the actual damper in a case where a continuous road surface input exceeding a predetermined dead frequency at which an sprung mass transmissibility would receive no effect from the set damping force coefficient on the damping force coefficient is present. Consequently, the vehicular comfort is worsened.

SUMMARY OF THE INVENTION

It is, therefore, an object of the present invention to provide a damping force coefficient controlling system and method for an automotive suspension which can assure an improved vehicular comfort.

The above-described object can be achieved by providing a damping force coefficient controlling system for a damper of a vehicular suspension, comprising: a) at least one damper adapted for receiving a control signal to vary its damping force coefficient in response to the control signal; b) first detecting means for detecting a vertical acceleration acted on a sprung mass of a vehicular body; c) second detecting means for detecting a relative speed between a sprung mass and the unsprung mass; d) deriving means for deriving a sprung mass vibrating frequency on the basis of output detected signals of the first and second detecting means; e) determining means for determining whether the derived sprung mass vibrating frequency is equal to or higher than a predetermined dead frequency or not; and, f) controlling means for outputting the control signal to the damper to change the damping force coefficient on the basis of a result of determination of whether the derived sprung mass vibrating frequency is equal to or higher than a predetermined dead frequency or not.

The above-described object can also be achieved by providing a method for controlling a damping force coefficient of a damper for a vehicular suspension having damping force changing means responsive to an input control signal for changing the damping force coefficient of the damper at a plurality of stages, comprising the steps of: a) detecting a vertical acceleration acted on a sprung mass of a vehicular body; c) detecting a relative speed between a sprung mass and the unsprung mass; d) deriving a sprung mass vibrating frequency on the basis of detected results of the steps a) and b); e) determining whether the derived sprung mass vibrating frequency is equal to or higher than a predetermined dead frequency or not; and, f) outputting the control signal to the damper to change the damping force coefficient on the basis of a result of determination of whether the derived sprung mass vibrating frequency is equal to or higher than a predetermined dead frequency or not.

DETAILED DESCRIPTION OF THE PREFERRED EMBODIMENTS

Reference will hereinafter be made to the drawings in order to facilitate a better understanding of the present invention.

Figure 1:
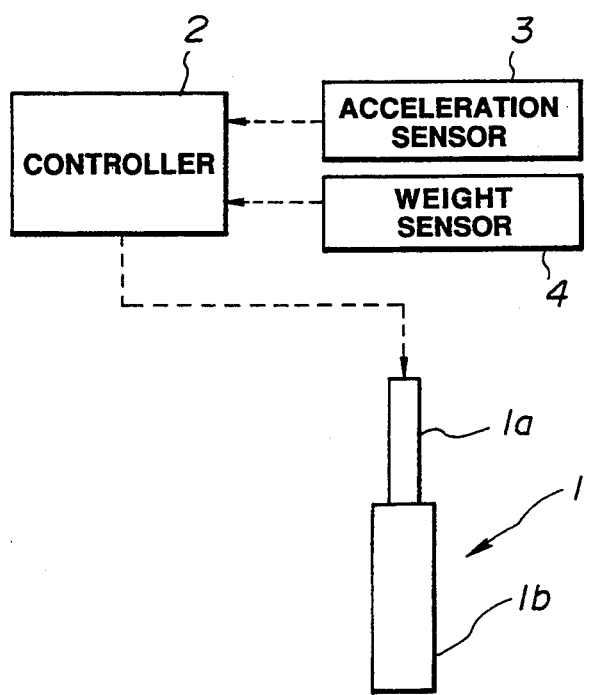
FIG. 1 is a circuit block diagram of a damping force coefficient controlling system according to a first preferred embodiment according to the present invention.

FIG. 1 shows a damping force coefficient controlling system according to a first preferred embodiment of the present invention.

It is noted that a damper denoted by 1 is a damping force variable type damper and that, according to the first embodiment, its damping force coefficient can be varied in three stages.

The structure of the damper 1 is exemplified by that disclosed in U.S. Pat. No. 4,961,483.

It is also noted that the damper 1 shown in FIG. 1 is disclosed by a Japanese Patent Application First Publication No. Showa 64-60411 published on Mar. 7, 1989 (Heisei 3-84237) in which the damping force coefficient can be varied in a plurality of stages.

The damper 1 includes a piston rod and damping force adjusting mechanism having a hydraulic flow adjuster installed in the piston rod. The damping force adjusting mechanism is rotated according to an input control signal derived from a controller (control unit) 2 so that a damping force range in an expansion stroke and in a compression stroke can be varied in three different stages from a softest position to a hardest position.

A pulse motor drives the damping force adjusting mechanism of the damper 1 to vary the position of the damping force adjusting mechanism between a multiple number of stages (in the first preferred embodiment, high and low). In other words, the damping force adjusting mechanism is capable of changing the damping force coefficient range to any one of the multiple number of stages from a minimum damping force to a maximum damping force.

A vertical acceleration sensor 3 detects an acceleration in a vertical direction of a sprung mass, i.e., a vehicle body and outputs an electric signal according to a magnitude of the vertical acceleration. In addition, the detected acceleration is integrated to provide a vertical velocity or speed signal and, therefore, the vertical acceleration sensor 3 serves as means for detecting the speed (viz., the velocity) of the sprung mass.

A weight sensor 4 is installed as relative velocity detecting means which detects a relative velocity between the unsprung mass and sprung mass, i.e., expansion side speed of the damper 1 and the weight sensor 4 are installed on a vehicular mount portion of the damper 1, for example, for detecting an input weight applied from the damper 1 to the vehicular body and outputting an electrical signal according to the indicated weight.

The controller 2 outputs the control signal to the pulse motor on the basis of the input signal derived from the vertical acceleration sensor 3 and weight sensor 4 so that the damper 1 exhibits an optimum damping force characteristic in response to the control signal.

Figure 2:
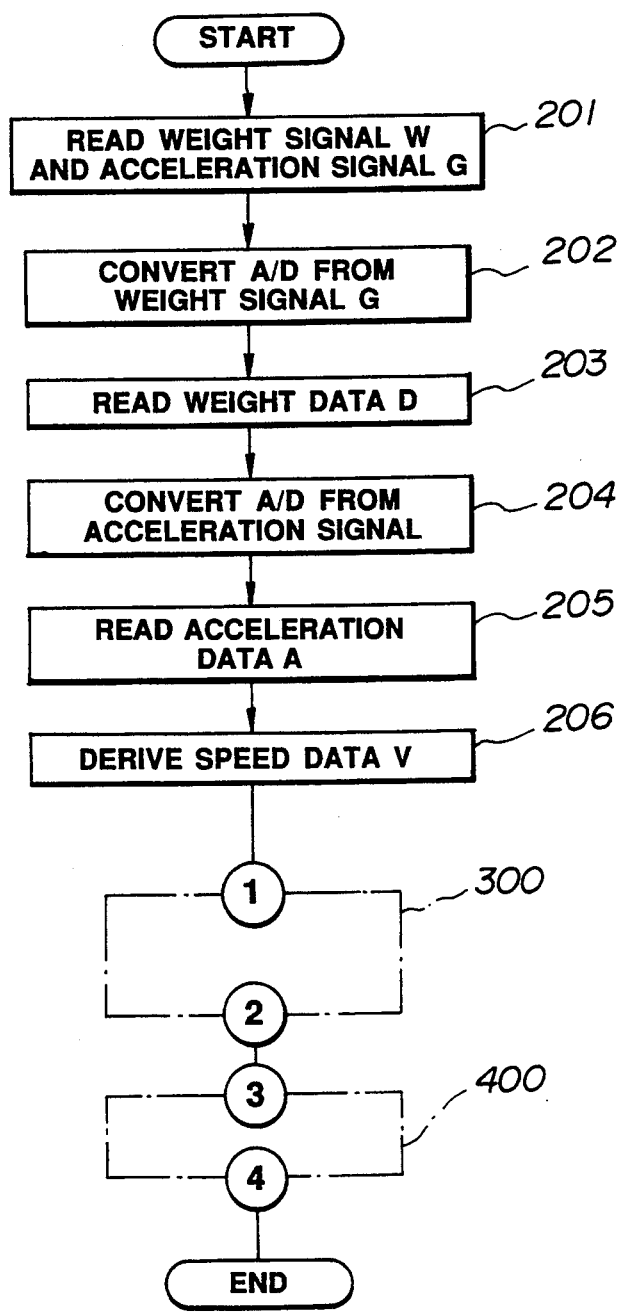
FIG. 2 is a general control flowchart showing a routine executed by a controller (control unit) shown in FIG. 1.

The nature of the control executed by the controller 2 according to the first preferred embodiment will be described with reference to the flowchart of FIG. 2.

The controller 2 includes a microcomputer which includes: a CPU (Central Processing Unit); a RAM (Random Access Memory); a ROM (Read Only Memory); and an I/O unit.

First, in step 201, the CPU reads a weight signal D derived from the weight sensor 4, and an acceleration value signal G derived from the vertical acceleration sensor 3. The routine then goes to step 202 wherein the weight signal D derived from the weight sensor 4 is digitally converted to derive the weight data D and then goes to step 204. In step 204, the acceleration value signal G is digitally converted to derive the acceleration data A and then goes to step 205.

Figure 3:
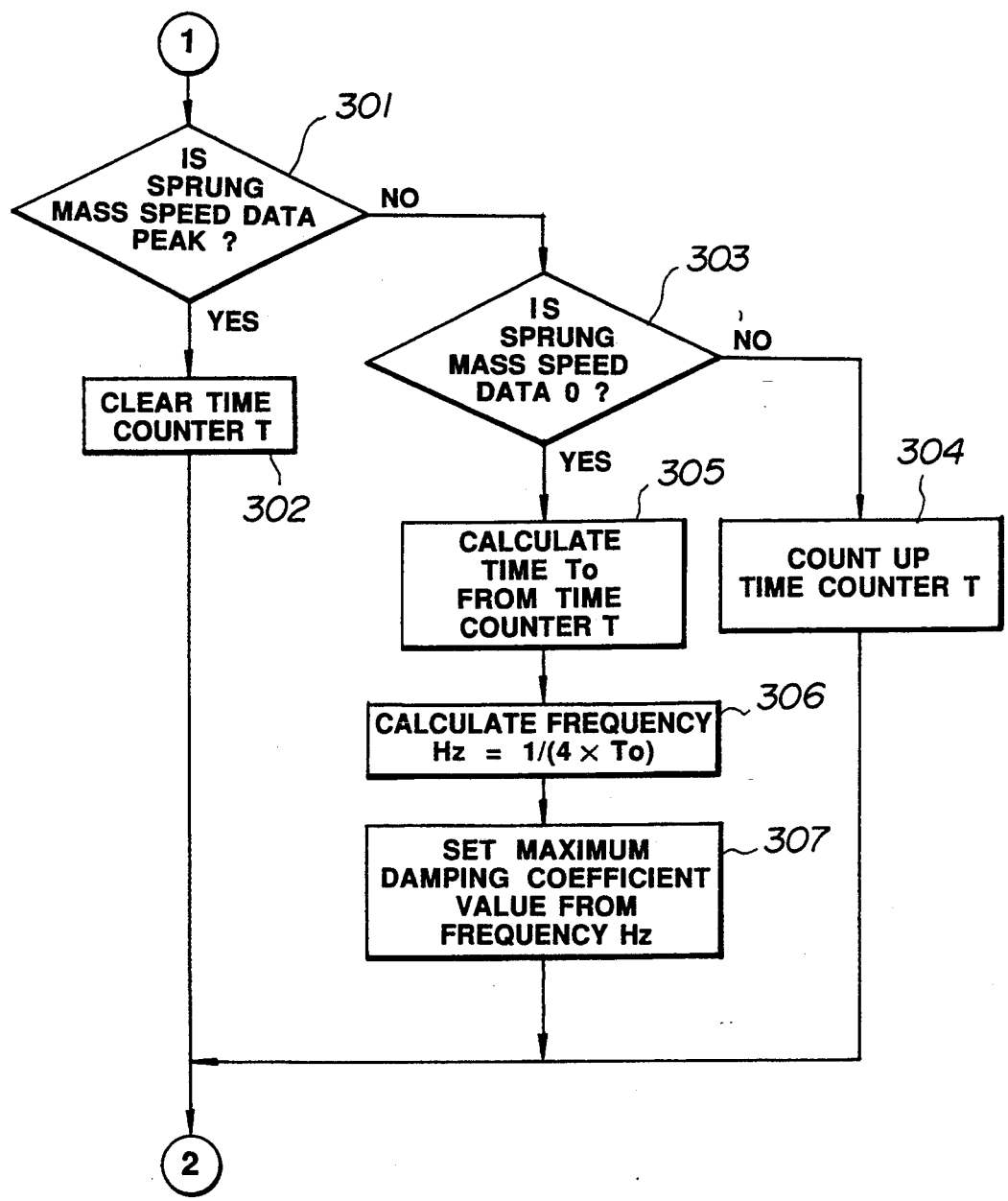
FIG. 3 is a detailed flowchart showing details of a step 300 shown in FIG. 1.

In step 206, the controller 2 calculates the sprung mass speed data V by integrating the acceleration data A to derive the sprung mass speed V. Then, the routine goes to sub-routine 300. In the maximum damping coefficient sub-routine 300, the routine initially goes to step 301 (see FIG. 3).

In the step 301, the controller 2 determines whether the sprung mass speed V has reached a peak. If YES, the routine goes to step 302 and, if NO, the routine goes to step 303. It is noted that whether the sprung mass speed data V has reached a peak or not may alternatively be determined by detecting a change in sign (viz., polarity) of the acceleration data A.

In step 302, a timer counter of the controller 2 is cleared. Then, the routine advances to a damping coefficient control sub-routine 400.

In step 303, the controller 2 determines whether the sprung mass speed data V is zero. If NO, the routine advances to step 304. If YES, the routine goes to step 305. It should be noted that the sprung mass speed data V can be derived by determining whether the acceleration data A has reached a peak.

In step 304, a time measurement is carried out by a timer counter. On the other hand, in step 305, a measurement value T is derived at this stage.

Figure 5:
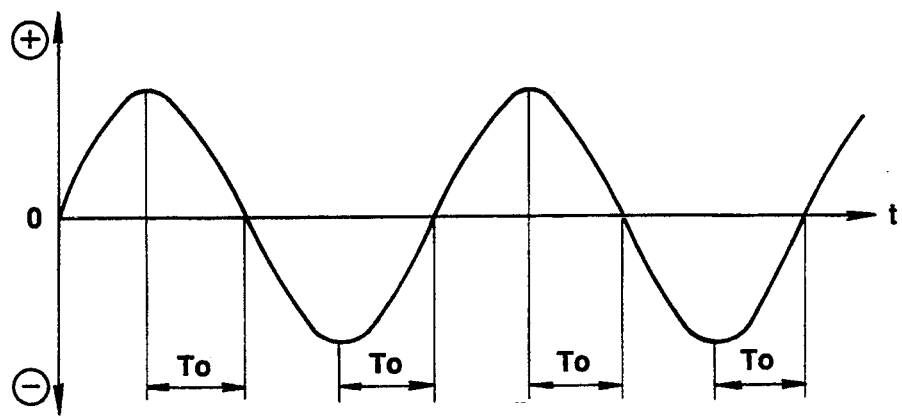
FIG. 5 is a waveform depicting a sprung mass vibrating frequency.

The timer counter is cleared at step 302 when the sprung mass speed data V is found to have reached a peak at step 301. The timer period counter is arranged in steps 303 and 304 to count from the time the data V peaks to the time the sprung mass speed data V reaches zero. Consequently, a time $T_o$ is measured which is indicative of $\frac{1}{4}$ of the sprung mass vibration period as will be appreciated from FIG. 5.

Figure 6:
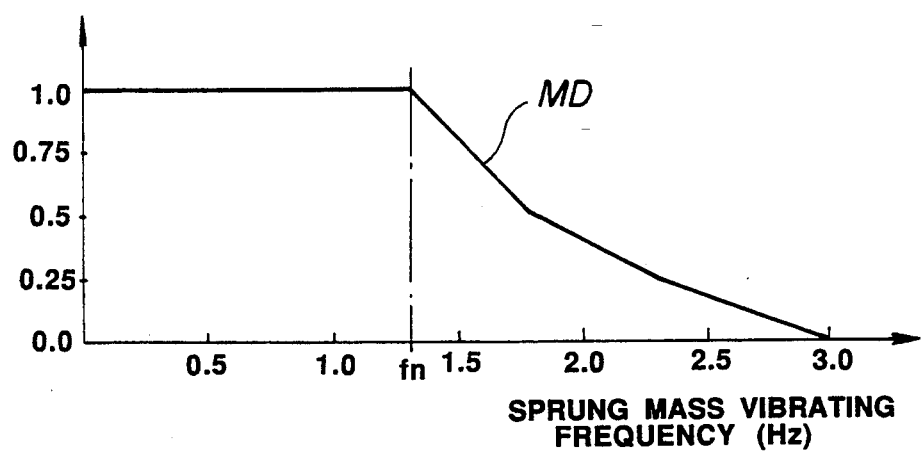
FIG. 6 is graph showing the change in maximum damping force coefficient value (MD) with respect to sprung mass vibration frequency.
Figure 7:
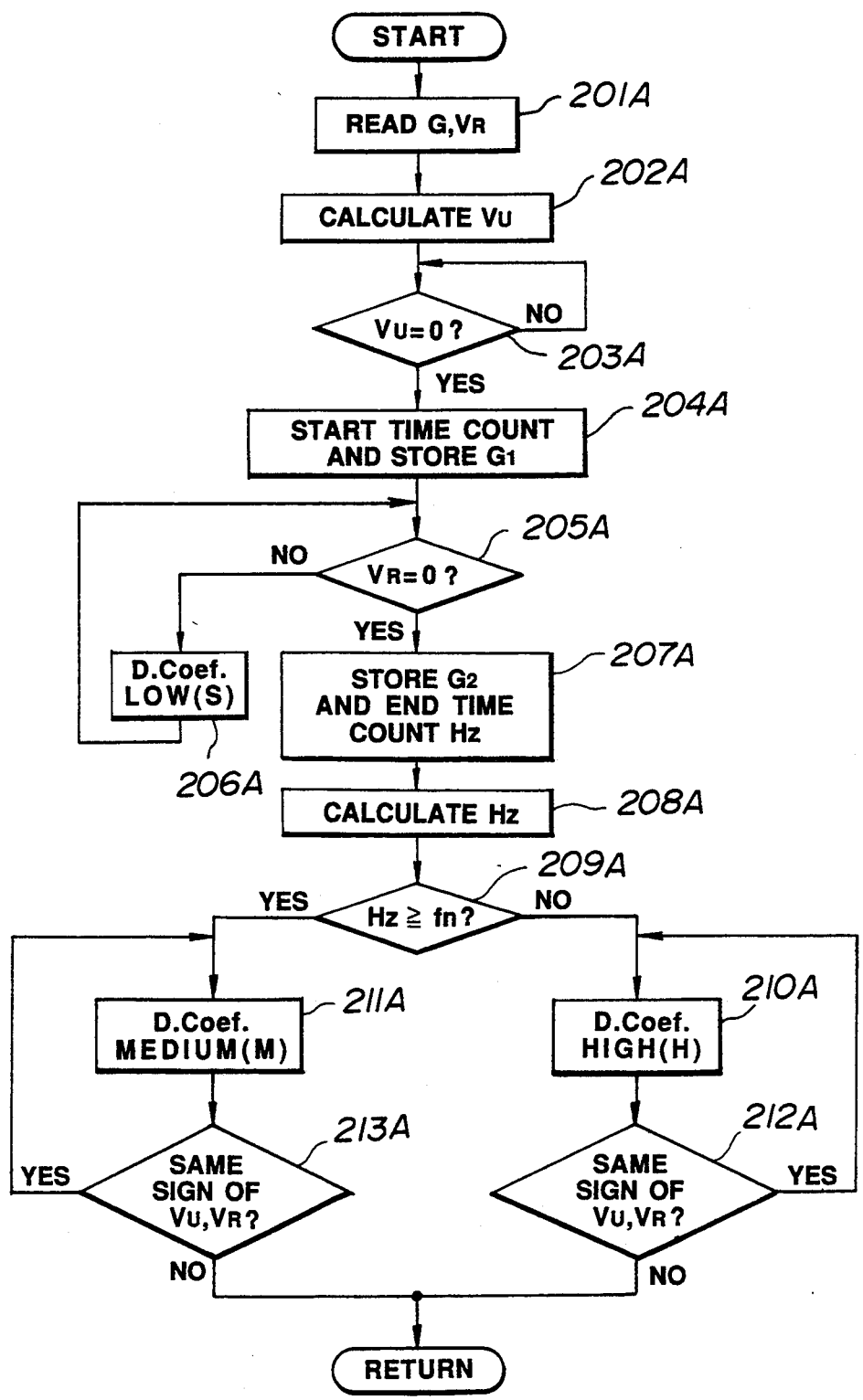
FIG. 7 is a control flowchart showing a routing executed by the controller of the damping force coefficient controlling system according to a second preferred embodiment of the present invention.

The subsequent step 307 is a step in which a maximum damping coefficient value is set from the thus-obtained sprung mass vibrating frequency $H_z$. That is to say, the controller 2 already stores a maximum damping coefficient ratio characteristic corresponding to the sprung mass vibrating frequency $H_z$ in a form of calculation equations. The maximum damping coefficient value MD is set on the basis of the maximum damping coefficient ratio characteristic. It is noted that this characteristic is such that the maximum damping coefficient value MD is set frequency $f_0$ but as the frequency becomes higher, the maximum damping coefficient becomes lower. It is also noted that although three calculation formulae according to the frequency region as shown in FIG. 6, are provided, the gradient of the characteristic becomes moderate as the frequency becomes high. In addition, the dead frequency $f_n$ is defined as a frequency denoted by $f_n$. in FIG. 9 at which the damping force does not influence the sprung mass, and wherein the characteristic of the sprung mass vibration transmissibility at a time of high damping coefficient (solid line) and the characteristic of the sprung mass vibration transmissibility at a time of low damping coefficient (a dot-and-dashed line) coincide at a frequency which is higher than the sprung mass resonant frequency $f_u$.

Figure 4:
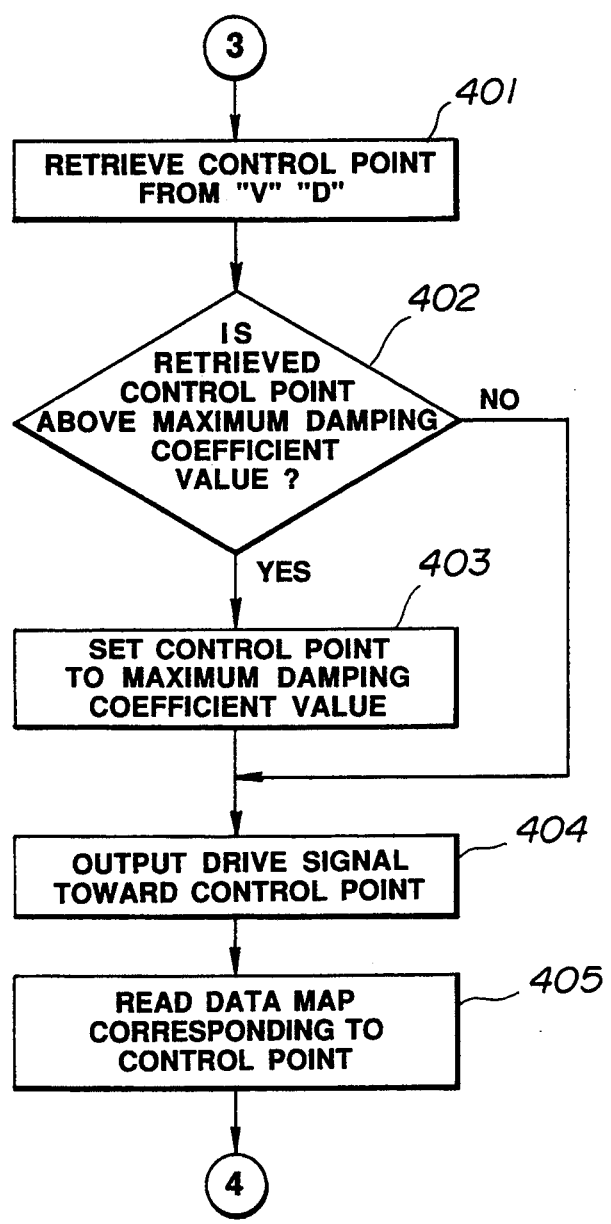
FIG. 4 is a detailed flowchart showing details of a step 400 shown in FIG. 1.

Upon completion of the maximum damping coefficient sub-routine 300, the routine goes to a damping coefficient control sub-routine 400 shown in FIG. 4.

As shown in FIG. 4, in step 400 the routine initially goes to step 401 in which a damping coefficient control point of the damper 1 is retrieved from a data map DM according to values of the sprung mass speed V and weight data D.

The data maps DM are adapted for table look up. A vertical axis is the weight data D. A lateral axis is the sprung mass speed data V. A position of intersection between the data D and V at that time denotes an optimum damping coefficient control point. It is noted that the relationships between the weight data D, sprung mass speed data V, and the damping coefficient may have the same relationship as in the calculation formulae, e.g., disclosed in a Japanese Patent Application First Publication No. Showa 62-181908 published on Aug. 10, 1987. The data maps DM are used to retrieve the optimum damping coefficient for improving the control response characteristic and to simplify the structure of the controller 2.

The data maps DM are arranged to represent a plurality of control stages of the damper so that the optimum damping coefficients to be transferred are minutely different for the respective control points.

In step 402, the controller 2 determines whether the set damping coefficient control point is higher than a maximum damping coefficient value MD. If YES, the routine goes to step 403. If NO, the routine goes to step 404.

In step 404, the controller 2 outputs the drive signal so as to achieve the control points derived in step 403.

Figure 11:
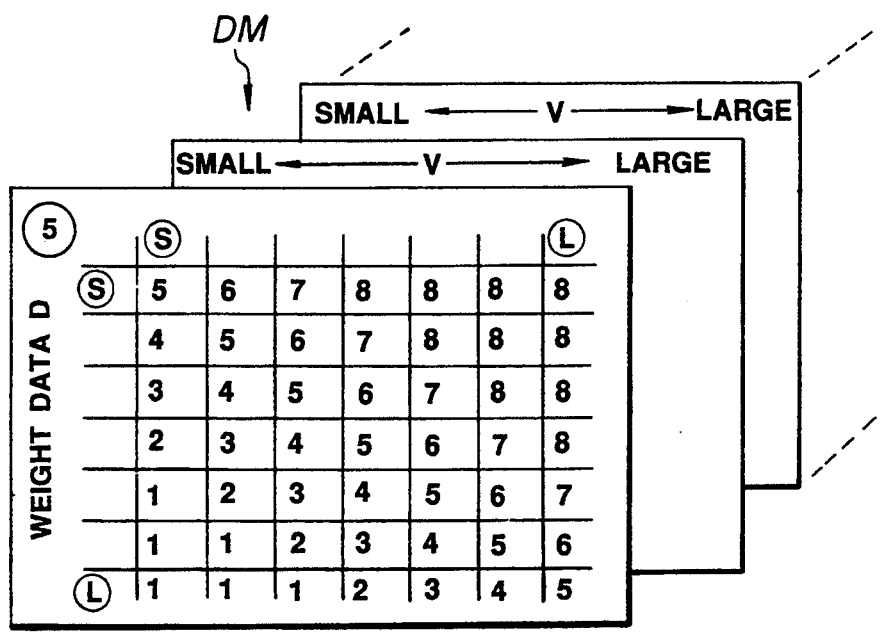
FIG. 11 is a schematic depiction of data maps DM which are used in the controller of the first embodiment of the invention shown in FIG. 1.

In step 405, the data map DM corresponding to the control points output in step 404 is read. Hence, in step 401, the controller 2 searches the data map DM corresponding to the present damping coefficient control point read in the previous processing of step 405. For example, the data map DM indicated by the front page shown in FIG. 11 is read in step 405 when a drive signal which renders the damping force coefficient at the fifth stage of controlled damping force as indicated by 5 at a left corner of this map, is output.

In the controller 2 of the first preferred embodiment, in a case where the sprung mass vibrating frequency $H_z$ is lower than the dead frequency $f_n$, an upper limit of a variable range of the damping coefficient, on the basis of the operation at a part of the maximum damping coefficient sub-routine 300 of the controller 2, is set at the maximum value (1,0) (refer to FIG. 6).

Hence, the damper 1 is controlled at the high damping force coefficient side according to its necessity on the basis of the operation of the part of the damping coefficient control subroutine 400 of the controller 2 so as to suppress the sprung mass transmissibility. Thus, vehicular riding comfort can be improved.

On the other hand, if the sprung mass vibrating frequency $H_z$ exceeds the dead frequency $f_n$, the part of the damping coefficient control sub-routine 400 executed by the controller 1 is such that the damping coefficient is controlled to a high damping side force coefficient and is increased. In this case, the upper limit of the variable range of the damping coefficient is gradually suppressed to a value lower than the current upper limit according to the frequency, as appreciated from FIG. 11, on the basis of the operation of the maximum damping coefficient sub-routine 300 of the controller 2. Hence, when the sprung mass vibrating frequency $H_z$ is high, the damper 1 is seldom set to a high damping force coefficient. No damping force is present than is necessary. Vehicular riding comfort is therefore improved.

As described above, since in the first preferred embodiment a damping force greater than that actually necessary, is not generated, and vehicular riding comfort can be improved.

In addition, although the damping force coefficient is controlled by retrieving the optimum damping force coefficient from a data map DM, the structure of the controller 2 can be simplified and the control responsive characteristic can be improved.

In addition, since in the first preferred embodiment the sprung mass vibrating frequency $H_z$ can be determined prior to one full cycle of vibration using the sprung mass speed data V peak to zero change, i.e., by measuring the time $T_o$ for one ¼ of the period of the vibration as indicated by the sprung mass speed data V changing from a peak to zero, and deriving the inverse of the time $T_o$ multiplied by four, the time required to detect becomes short and control responsive characteristic are improved.

Furthermore, in the first preferred embodiment when the sprung mass vibrating frequency $H_z$ exceeds the dead point frequency $f_n$, the maximum damping coefficient value MD gradually becomes smaller as the frequency increases, and accordingly the damping force characteristic is not abruptly changed and the vehicular riding comfort is not deteriorated due to the abrupt change in the damping force characteristic.

It is to be noted that although, in the first preferred embodiment, the maximum damping force coefficient is gradually reduced in proportion to the frequency in a frequency region exceeding the dead frequency $f_n$, the maximum damping coefficient may be reduced in a stepwise manner. On the other hand, the maximum damping coefficient may alternatively be changed in the frequency band below the dead frequency $f_n$.

Although, in the first preferred embodiment, the sprung mass vibrating frequency is derived by timing a ¼ period of the vibration, other means which converts the sprung mass vibration into a voltage may be used.

Figure 9:
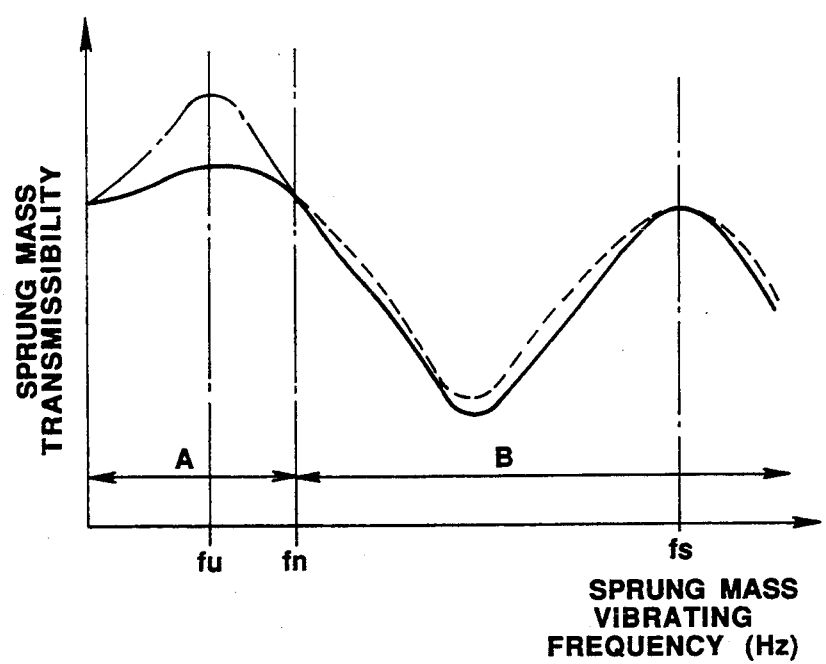
FIG. 9 is a graph representing an sprung mass transmissibility with respect to an sprung mass vibrating frequency $H_z$ characteristic which occurs in the second preferred embodiment.

FIG. 9 shows another general flowchart depicting a routine executed by the controller 2 in accordance with a second preferred embodiment. The structure of the damping force coefficient controlling system in the second preferred embodiment is substantially the same as that of the first preferred embodiment shown in FIG. 1.

It is noted that the damping force coefficient of the damper 1 can be varied at three stages in the second preferred embodiment.

In step 201A of FIG. 9, the controller 2 reads the vertical acceleration G derived by the acceleration sensor 3 and the relative speed $V_R$ derived by the weight sensor 4.

The relative speed $V_R$ corresponds to the load (or weight) detected by the weight senor 4 which is mounted on an attached portion of the piston rod of the piston of the damper 1 to the vehicular body.

In step 202A, the controller 2 calculates a sprung mass speed $V_u$ by integrating the vertical acceleration G derived from the acceleration sensor 3.

In step 203A, the controller 2 determines whether the sprung mass speed $V_u$ is zero. If NO step 203A cycles until the controller 2 determines that the sprung mass speed $V_u$ is zero. When YES is detected in step 203A, the routine goes on to step 204A.

In step 204A, the sprung mass speed $V_U$ is stored as acceleration $G_1$, and a time measurement is initiated.

In step 205A, the controller 2 determines whether the relative speed $V_R$ is zero or not.

Figure 10:
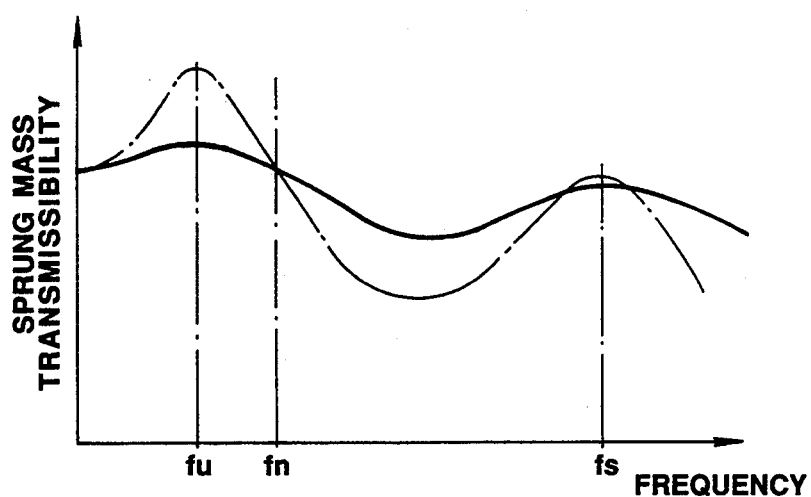
FIG. 10 is a graph similar to that shown in FIG. 9 showing the relationship which occurs in the first embodiment.

If NO in step 205A, the routine goes to step 206A in which a low damping force control is carried out such that the damping force coefficient is transferred to the low damping force coefficient (a coefficient denoted by S of FIG. 10). Then, the routine returns to step 205A and steps 205A and 206A are repeated until the sprung mass speed is indicated as being zero. On the other hand, in response to YES in step 205A, the routine goes to step 207A.

In step 207A, the controller 2 stores the vertical acceleration $G_2$ at that time when the relative speed $V_R$ is determined to be zero. The time measurement started at the step 204A is stopped. Then, a time $T_o$ from the time at which the sprung mass speed $V_u$ indicates zero and to the time at which the relative speed $V_R$ indicates zero is obtained.

In step 208A, the sprung mass vibrating frequency $H_z$ is calculated on the basis of the stored vertical accelerations $G_1$, $G_2$, and time $T_o$.

Figure 8:
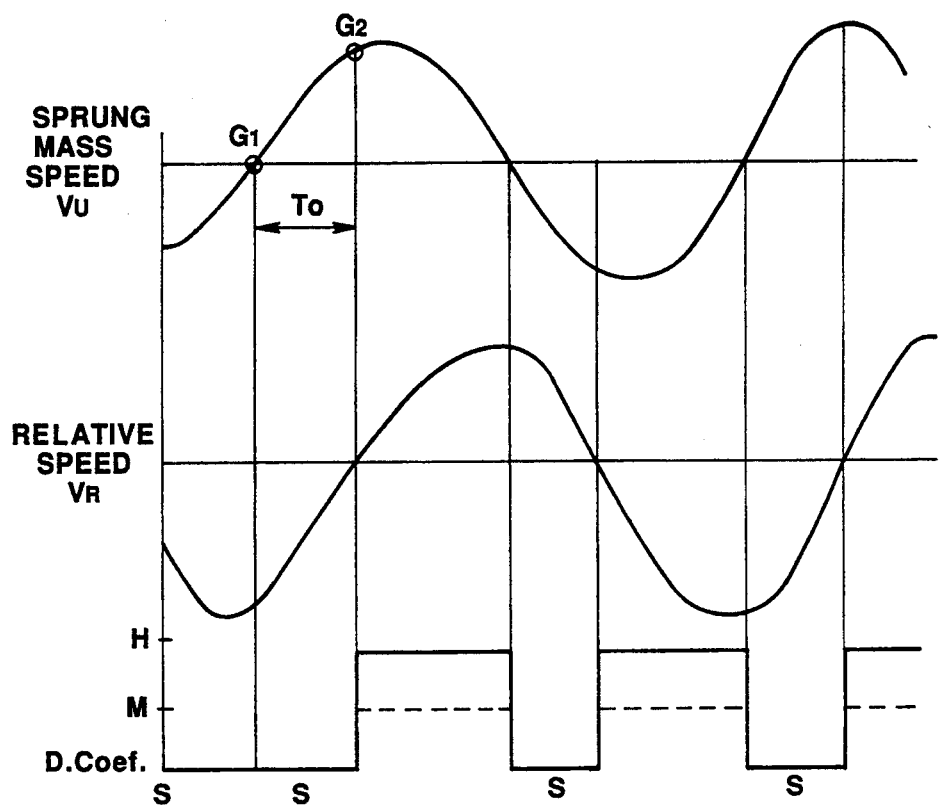
FIG. 8 is an explanatory view showing waveforms of the sprung mass speed $V_u$ and relative speed $V_R$ used in the second preferred embodiment.

That is to say, as shown in the graph of FIG. 8, the sprung mass speed $V_u$ can be expressed in the following equation ①. Hence, the vertical acceleration G can be expressed in the following equation ②. The vertical acceleration $G_1$, when the sprung mass speed is zero, and the vertical acceleration $G_2$ when the relative speed $V_R$ is zero, are expressed in the following equations ③ and ④. Hence, $\omega$ is expressed in the following equation ⑤. Furthermore, the sprung mass vibrating frequency $H_z$ is derived in the following equation ⑥.

$$V = A \sin \omega t \qquad ①$$

$$G = dV/dt = A\omega \cos \omega t \qquad ②$$

$$G_1 = A\omega \cos \omega \times 0 = A\omega \qquad ③$$

$$G_2 = A\omega \cos \omega T0 \qquad ④$$

$$\omega = \cos^{-1}(G_2/G_1)T_0 \qquad ⑤$$

$$Hz = \omega/2\pi = \tfrac{1}{2}\pi \cos^{-1}(G_2/G_1)/T_0 \qquad ⑥$$

In step 209A, the controller 2 determines whether the derived sprung mass vibrating frequency $H_z$ exceeds the dead point frequency $f_n$. If NO in step 209A, the routine goes to step 210A. If YES in step 209A, the routine goes to step 211A. It is to be noted that the dead point frequency $f_n$. is already explained in the first preferred embodiment.

As shown in FIG. 9, a region denoted by A is one in which the sprung mass transmissibility of the low damping coefficient (a dot-and-dash line) is lower than that of the high damping coefficient (solid line) and wherein no problem occurs even when a control delay is generated. A region denoted by B is one in which the sprung mass vibration transmissibility of the high damping coefficient (a broken line) falls below that of the lower damping coefficient (solid line; it should be noted that the solid line corresponds to an intermediate damping coefficient denoted by M of FIG. 8).

In step 210A, the controller 2 carries out the high damping control in which the damping force coefficient is controlled to a predetermined high value (a coefficient denoted by H of FIG. 8).

In step 212A, the controller 2 determines whether the sign (polarity) of the sprung mass speed $V_u$ is the same as that of the relative speed $V_R$. If YES in step 212, the routine repeats the processes of step 210A. If NO in step 212, the routine returns to the initial start point.

On the other hand, step 211A performs a high damping avoiding control such that the damping force coefficient is controlled to an intermediate damping force coefficient (M). That is to say, when the controller 2 determines YES in step 207A, the sign of the sprung mass speed $V_u$ has the same sign as the relative speed $V_R$. Although the controlled damping force is controlled to the high damping coefficient (H) in the case of the previously proposed damping force coefficient controlling system, the damping force coefficient is, in this case, set to the intermediate damping coefficient (M) in step 211A in the second preferred embodiment.

A step 213A determines whether the sign of the sprung mass speed $V_U$ is the same as that of the relative speed $V_R$. If YES, step 211A is repeated. If NO, the routine is returned to the initial start point of the routine.

Next, the operation of the second preferred embodiment will be described below.

If, in the second preferred embodiment, the sign of the sprung mass speed $V_U$ is the same as that of the relative speed $V_R$ and the sprung mass vibrating frequency $H_z$ exceeds the dead point frequency $f_n$, the damping force coefficient is controlled to the intermediate damping coefficient M without being set to the high damping coefficient H.

Hence, even if the control timing is deviated due to influences such as electrical delays and hydraulic pressure transmission delay in a vibrating frequency region exceeding the dead point frequency $f_n$, the influence on the vehicular riding comfort is attenuated.

As appreciated from FIG. 9, which shows characteristic graphs comparing the sprung mass transmissibility of the second preferred embodiment (solid line) with the transmissibility of the previously proposed damping coefficient controlling system (broken line), the sprung mass transmissibility reduces in a frequency region greater than the dead point frequency $f_n$.

In the second preferred embodiment, the sprung mass transmissibility is reduced and the vehicular riding comfort can be improved.

In the second preferred embodiment, since the sprung mass vibrating frequency $H_z$ is detected during the period defined between the sprung mass speed assuming a zero value and the relative speed becoming zero, the detection of the sprung mass vibrating frequency $H_z$ can be carried out in a very short period of time and the control response characteristics can be improved.

In addition, although, in the second preferred embodiment, the damping force coefficient control is carried out toward a damping force coefficient intermediate between the high damping force coefficient and low damping force coefficient, it may be controlled toward the low damping force coefficient.

In this case, step 211A is changed to the control toward the low damping force coefficient side.

As described hereinabove, since, in the damping force coefficient controlling system and method according to the present invention, the sprung mass vibrating frequency $H_z$ is derived and the maximum damping coefficient MD is set so as to suppress the damping force coefficient toward the higher damping force coefficient side or the control of the damping force coefficient side toward a higher damping force coefficient side, is avoided according to the result of determination of whether the sprung mass vibrating frequency is above the dead frequency, and a damping force of the damper which is greater than necessary is not produced and does not affect the vehicular riding comfort.

Various advantages are obtained from the damping force coefficient controlling system and method according to the present invention.

It will fully be appreciated by those skilled in the art that the foregoing description has been made to the preferred embodiment and various changes and modifications may be made without departing from the scope of the present invention which is to be defined by the appended claims.

What is claimed is:

1. A damping force coefficient controlling system for a vehicular suspension, comprising:
   a damper, said damper including means responsive to a control signal for varying a damping force coefficient of said damper in response to the control signal;
   first detecting means for detecting a vertical acceleration of a sprung mass of a vehicular body;
   second detecting means for detecting a relative speed between the sprung mass and an unsprung mass;
   deriving means responsive to said first and second detecting means for deriving a sprung mass vibration frequency using the vertical acceleration and relative speed respectively detected by said first and second detecting means;
   determining means for determining whether the derived sprung mass vibrating frequency is lower than a predetermined dead frequency (fn), said predetermined dead frequency being a sprung mass vibration frequency which is higher than a sprung mass vibration resonance frequency and a frequency at which a sprung mass vibration transmissibility is uneffected irrespective of the magnitude of the damping coefficient which said damper is conditioned to produce; and
   controlling means responsive to said determining means for outputting the control signal to the damper to change the damping force coefficient in accordance with the determination of whether the derived sprung mass vibrating frequency is lower than a predetermined dead frequency or not.

2. A damping force coefficient controlling system as set forth in claim 1, wherein said controlling means derives a maximum damping coefficient value (MD) from a preset maximum damping coefficient schedule according to the derived sprung mass vibrating frequency ($H_z$) and wherein the maximum damping coefficient value (MD) is set to a predetermined value when the sprung mass vibrating frequency is less than the predetermined dead frequency (fn), and the maximum damping coefficient (MD) is reduced as the sprung mass vibrating frequency increases above said predetermined dead frequency (fn).

3. A damping force coefficient controlling system as set forth in claim 2, wherein said controlling means derives a sprung mass speed (V) according to a first output signal of said first detecting means, derives an optimum damping coefficient control point according to values of the derived sprung mass speed (V) and a second output signal of said second detecting means, and outputs said control signal to said damper so that said damper is conditioned to produce an optimum damping force coefficient with the maximum damping force coefficient (MD) as an upper limit of the damping force coefficient.

4. A damping force coefficient controlling system as set forth in claim 1, wherein said deriving means derives the sprung mass vibrating frequency (Hz) as follows:

$$H_z = \frac{1}{2\pi} \frac{\cos^{-1}(G_2/G_1)}{T_0}$$

wherein G1 denotes a vertical acceleration of the sprung mass when a sprung mass speed derived by integrating an output of said first detecting means is zero, G2 denotes a vertical acceleration when a relative speed between the sprung mass and unsprung mass detected by the second detecting means, is zero, and $T_o$ denotes a time interval from a point in time when the sprung mass speed is zero to a point in time when the relative speed is zero.

5. A damping force coefficient controlling system as set forth in claim 4, wherein said controlling means determines whether the sprung mass speed has a sign which is the same as that of the sprung mass relative speed, and outputs the control signal to the damper so that the damping force coefficient is set to a higher damping force coefficient value (H) until the sprung mass speed has the same sign as that of the relative speed when the vibrating frequency Hz is not lower than the predetermined dead frequency $f_n$.

6. A damping force coefficient controlling system as set forth in claim 5, wherein said controlling means determines whether the sprung mass speed has the same sign as that of the relative speed and outputs the control signal to the damper so that the damping force coefficient of said damper is set to a higher damping force coefficient (H) when the sprung mass speed has the same sign as that of the relative speed and the sprung mass vibrating frequency Hz is not lower than the predetermined dead frequency $f_n$.

7. A damping force coefficient controlling system as set forth in claim 6, wherein said controlling means determines whether the sprung mass speed has the same sign as that of the relative speed and outputs the control signal to said damper so that the damping force coefficient of said damper is set to a medium damping force coefficient (M) until the sprung mass speed has the same sign as that of the relative speed when the sprung mass vibrating frequency $H_z$ is less than the predetermined dead frequency $f_n$.

8. A damping force coefficient controlling system comprising:
   a damper, said damper including means responsive to a control signal for varying a damping force coefficient of said damper in response to the control signal;
   first detecting means for detecting a vertical acceleration of a sprung mass of a vehicular body;

second detecting means for detecting a relative speed between the sprung mass and an unsprung mass;

deriving means responsive to said first and second detecting means for deriving a sprung mass vibration frequency;

determining means for determining whether the derived sprung mass vibrating frequency is lower than a predetermined dead frequency; and control means responsive to said determining means for outputting the control signal to said damper to change the damping force coefficient in accordance with the determination of whether the derived sprung mass vibrating frequency is lower than a predetermined dead frequency or not; and wherein said predetermined dead frequency (fn) is defined as a sprung mass vibrating frequency at which a sprung mass vibration transmissibility characteristic when the damper damping force coefficient is relatively high coincides with a sprung mass vibration transmissibility characteristic when the damper damping force coefficient is relatively low.

9. A damping force coefficient controlling system as set forth in claim 8, wherein said deriving means derives the sprung mass vibrating frequency ($H_z$) by:

deriving the sprung mass speed (V) by integrating an acceleration indicative output of the first detecting means;

measuring a time interval ($T_0$) from a time when the sprung mass speed (V) peaks to a time when the sprung mass speed (V) reaches zero; and deriving the sprung mass vibrating frequency, ($H_z$) as follows:

$$H_z = 1/(4 \times T_0)$$

10. A method for controlling a vehicular suspension having a damper which includes a damping force changing means which is responsive to an input control signal for changing the damping force coefficient of the damper at a plurality of stages, comprising the steps of:

detecting a vertical acceleration of a sprung mass of a vehicular body;

detecting a relative speed between an unsprung mass and the sprung mass;

deriving a sprung mass vibrating frequency on the basis of said vertical acceleration and said relative speed;

determining whether the derived sprung mass vibrating frequency is equal to or higher than a predetermined dead frequency or not;

setting said predetermined dead frequency as a sprung mass vibration frequency which is higher than a sprung mass vibration resonance frequency and a frequency at which a sprung mass vibration transmissibility is uneffected irrespective of the magnitude of the damping coefficient which said damper is conditioned to produce; and outputting the control signal to the damper to change the damping force coefficient on the basis of a result of the determination of whether the derived sprung mass vibrating frequency is lower than a predetermined dead frequency or not.

* * * * *